(12) United States Patent
White, Sr.

(10) Patent No.: US 8,801,076 B2
(45) Date of Patent: Aug. 12, 2014

(54) SAIL SYSTEM FOR LAND VEHICLES

(71) Applicant: Kevin C White, Sr., Keyport, NJ (US)

(72) Inventor: Kevin C White, Sr., Keyport, NJ (US)

(73) Assignee: Landsail Corp., Staten Island, NY (US)

(*) Notice: Subject to any disclaimer, the term of this patent is extended or adjusted under 35 U.S.C. 154(b) by 0 days.

(21) Appl. No.: 13/775,189

(22) Filed: Feb. 24, 2013

(65) Prior Publication Data
US 2013/0221700 A1    Aug. 29, 2013

Related U.S. Application Data

(60) Provisional application No. 61/603,263, filed on Feb. 25, 2012.

(51) Int. Cl.
B60J 7/00 (2006.01)
(52) U.S. Cl.
USPC ........................................ 296/180.1
(58) Field of Classification Search
USPC ................ 296/180.1–180.5, 211, 91; 29/428; 280/851
See application file for complete search history.

(56) References Cited

U.S. PATENT DOCUMENTS

| 4,214,786 | A | | 7/1980 | Morrison | |
| 4,309,053 | A | * | 1/1982 | Lett | 296/180.4 |
| 4,787,665 | A | | 11/1988 | Rich | |
| 5,375,882 | A | * | 12/1994 | Koch, III | 280/851 |
| 5,653,493 | A | * | 8/1997 | Spears | 296/180.2 |
| 6,099,069 | A | * | 8/2000 | Spears | 296/180.2 |
| 8,033,594 | B2 | * | 10/2011 | Nusbaum | 296/180.4 |
| 2002/0109375 | A1 | * | 8/2002 | Hung | 296/180.1 |
| 2008/0116715 | A1 | | 5/2008 | Steel | |
| 2009/0256382 | A1 | | 10/2009 | Stum | |
| 2013/0076064 | A1 | * | 3/2013 | Smith et al. | 296/180.1 |

* cited by examiner

Primary Examiner — Pinel Romain
(74) Attorney, Agent, or Firm — FisherBroyles LLP; Richard M. Lehrer

(57) ABSTRACT

A sail system and method for controlling the same is provided for use with large land vehicles. When deployed, at a vehicles normal cruising speed it will produce lift which reduces the ground weight of the vehicle, thus reducing friction and increasing fuel economy.

15 Claims, 2 Drawing Sheets

SAIL SYSTEM FOR LAND VEHICLES

CROSS REFERENCE TO RELATED APPLICATIONS

This application claims the benefit of the filing date of U.S. provisional patent application No. 61/603,263 entitled "Sail System for Land Vehicles", which was filed on Feb. 25, 2012, by the same inventor of this application. That provisional application is hereby incorporated by reference as if fully set forth herein.

FIELD OF THE INVENTION

The invention relates generally to sails and airfoils and more particularly to an adjustable sail system configured to selectively lighten a load of a vehicle travelling across land and methods for controlling aspects of the system.

BACKGROUND OF THE INVENTION

A conventional sail is typically flexible and used by boats and/or small recreational land vehicles to provide forward movement. Conventional airfoils are typically made from a rigid material and are used by vehicles predominantly to reduce drag.

U.S. patent application Ser. No. 12/023,622 entitled Truck Streamlining and Ser. No. 12/384,875 entitled One-Piece Aerodynamic Truck Bed Enclosure are exemplary of conventional airfoils.

Many large trucks employ single wheels with oversized tires on both the tractor and trailer/bluff in lieu of a dual wheel configuration. While more expensive, the oversized tires are more fuel efficient than multiple thinner tires. Additionally, many trucks employ a "skirt" affixed under the trailer. The purpose of this "skirt" is to keep air that has been deflected by the tractor from having to again be deflected by the rear wheels of the trailer. Thus, recent innovation for large trucks tends to revolve around increasing fuel economy/efficiency.

Conventional airfoils are predominantly configured to reduce drag and thus increase fuel efficiency. A by-product for some airfoils is that they produce some lift as well, which also adds to fuel efficiency. But conventional airfoils are constructed of relatively rigid materials. On a low vehicle such as a car or pickup truck adding a relatively rigid airfoil does not present a problem. However, on larger vehicles such as semi-trucks, box trucks, busses and recreational vehicles, the added height of the airfoil poses a potential problem when driving under an overpass or street sign, etc. Since conventional air foils are made from relatively rigid materials, adding such an air foil to a truck or bus could also pose a safety risk.

It would thus be advantageous to create a sail that could be attached to a vehicle that provides lift like an air foil but is flexible to minimize the additional dangers associated with driving under overpasses or other height related obstacles.

It would also be advantageous to provide controls for adjusting the amount of lift provided by the sail.

BRIEF SUMMARY OF THE INVENTION

Many advantages of the invention will be determined and are attained by the invention, which in a broadest sense provides a sail for a land vehicle and methods for adjusting the same. An embodiment of the invention provides a sail which is attached to the top portion of a vehicle, such as a bus or truck or the like. The top portion could be the actual top of the vehicle or a location proximal thereto. Controls are provided which allow the sail to be trimmed thus providing more or less lift as necessary and which allows the sail to be lowered to prevent accidents with overhead obstacles.

Embodiments of the invention provide a sail system for use with a land vehicle. The system includes a sail made from a flexible material. The sail is configured for movable attachment to the vehicle. The sail is also substantially aligned with an upper surface 205 of the vehicle and provides a space below a lower surface 25 of the sail, such that while the vehicle is moving the sail creates lift.

Aspects of the invention provide a method for improving fuel efficiency of a land vehicle. The method includes attaching a sail to a top portion of the vehicle, and providing control for configuring the sail relative to the vehicle such that the control is capable of adjusting an amount of lift created by the sail while the vehicle is in motion. At least a majority of the sail is substantially aligned with an upper surface of the vehicle which enables the sail to create lift while the vehicle is in motion.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the invention, reference is made to the following description, taken in conjunction with the accompanying drawings, in which like reference characters refer to like parts throughout, and in which.

The invention will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Figure 1:
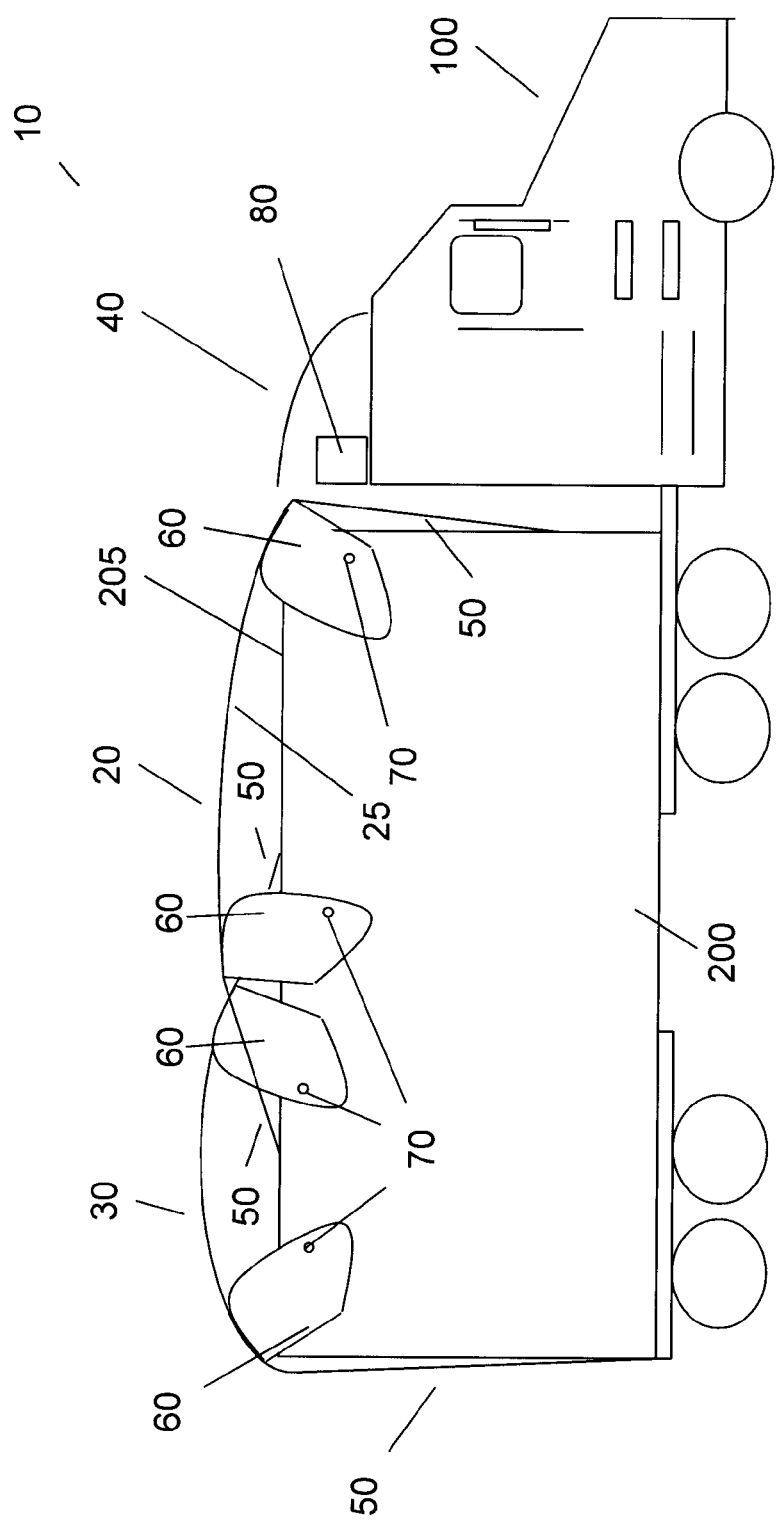
FIG. 1 is line drawing of a truck employing a sail system in accordance with one or more embodiments of the invention.
Figure 2:
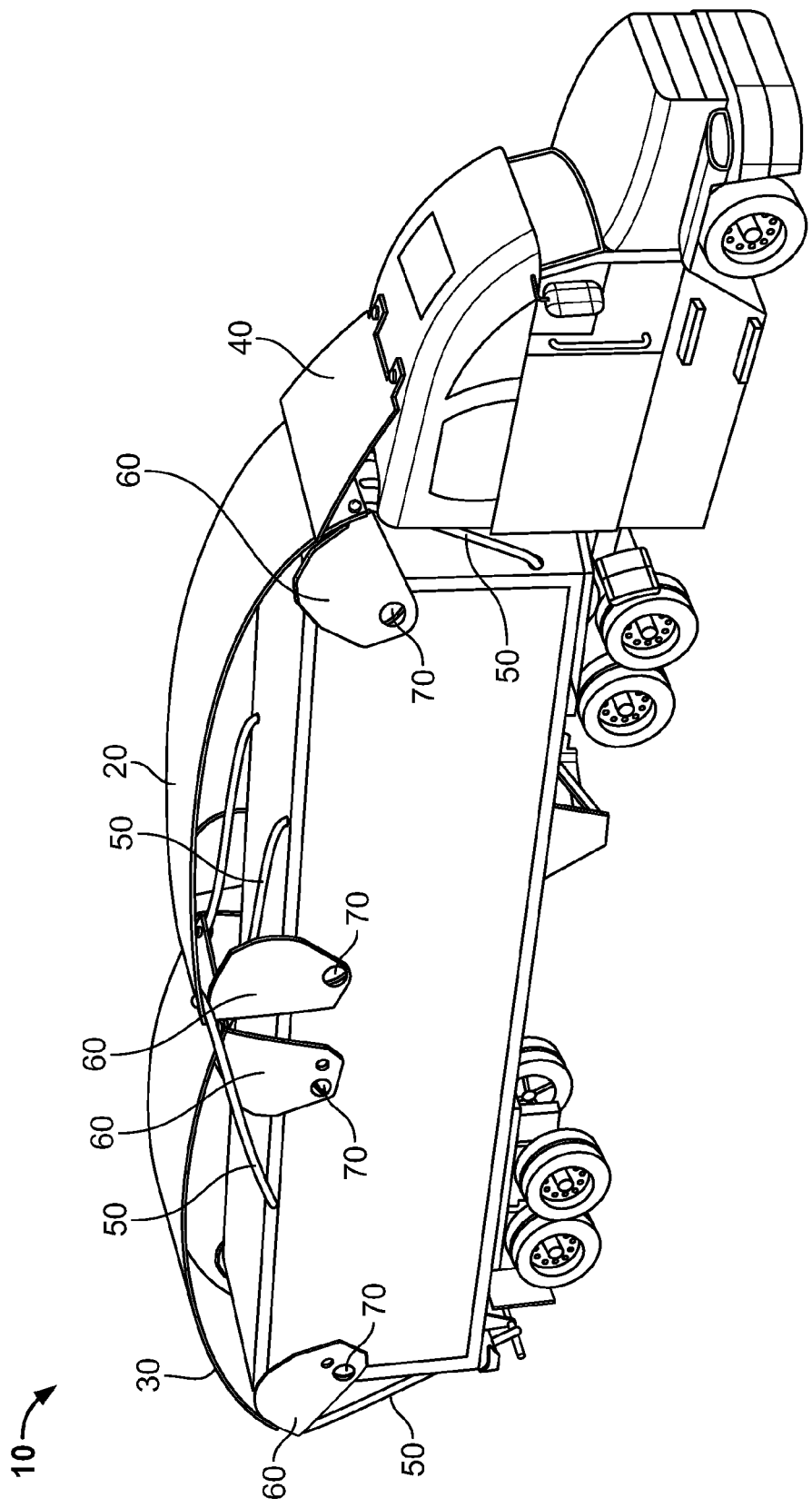
FIG. 2 is a perspective view of FIG. 1.

Referring to the drawings in detail wherein like reference numerals identify like elements throughout the various figures, there is illustrated in FIGS. 1-2 a sail system and method for controlling the same according to the invention. These systems may be employed in all types of vehicles such as large trucks, busses, campers or the like. This sail system, when deployed at a vehicle's normal cruising speed will produce enough lift to reduce the ground weight of the vehicle and apparatus, thus reducing friction and increasing fuel economy. The principles and operations of the invention may be better understood with reference to the drawings and the accompanying description.

In a preferred embodiment as illustrated in FIG. 1, the sail system 10 includes a set of sails 20, 30 and 40 respectively arranged at the top of a truck. While the system is illustrated on a truck those skilled in the art will recognize that the invention is not so limited. Sail 40 is connected to the top of the cab 100 and directs the airflow to the top of the trailer/bluff 200. Sail 20 is attached to the top of the trailer 200 at or near the front and runs above the top of the trailer 200. Sail 30 is attached at or near the rear of the trailer 200 and runs forward above the top of the trailer 200 terminating below sail 20. Those skilled in the art will recognize that sail system 10 could be employed with fewer than 3 sails or with additional sails and still fall within a scope of the invention. For example, there could be a series of smaller sails starting at or near the front of the trailer 200 and working back towards the rear of the trailer 200; each successive sail going rearward being attached to the truck at or near the terminating side of the sail immediately forward of that sail. By way of another example, a single sail could be employed which is attached at or near the front of the trailer 200 or further back toward the middle of the trailer 200 and still fall within a scope of the invention. Further, those skilled in the art will recognize that the system could be modular and attach to the trailer 200 as a single or multiple units.

Sails 20, 30, 40 are attached to the trailer by poles 50 which are attached to the sails at or near the corners of the sails. Those skilled in the art will recognize that other conventional methods may be employed for attaching the sails to the trailer without departing from a scope of the invention. The poles 50 may be selectively and/or movably attached to the truck so that the sails 20, 30, 40 may be selectively retracted, deployed and adjusted. While the sails 20, 30, 40 are illustrated as free sheets of material, they could be framed on one or more sides and still fall within a scope of the invention.

In a preferred embodiment, sails 20, 30, 40 lay flat against the truck when not in use. However those skilled in the art will recognize that this is merely a design choice. The sails may be configured such that they are rolled up, retracted into the truck or any other conventional method of storing a sail when not in use. As a safety feature, the sails may be configured to collapse onto the truck, break away or give way in the event that they come into contact with a solid object such as a sign or an overpass.

Sails 20, 30, 40 can be configured to be independently adjusted, adjusted as a single unit or some combination between. Each sail has the capacity to be remotely deployed and retracted as well as "trimmed" to produce optimum lift as conditions vary. Those skilled in the art will recognize that one or more of the sails could require manual adjustment without departing from a scope of the invention.

It is presently considered that a total sail area would be approximately 500 sq. ft. and a maximum sail width would be 8.5 ft (the typical width of a truck). Those skilled in the art will recognize that these dimensions could change to fit a specific truck or vehicle.

As illustrated in FIG. 1 deployment fins 60 serve to deploy and retract the device as well as provide a lateral stabilizing force. In a preferred embodiment they have the capability to retract into the walls of the trailer when the device is not in use. Those skilled in the art will recognize that fins 60 could also rotate about pivot points 70 and remain outside of the truck or could be selectively removable and still fall within a scope of the invention. Trim lines 50 could be load bearing cables or poles that tension the deployed device for optimum lift as conditions vary. These lines 50 also retract into the trailer when the device is not in use, although as with the fins 60 they could remain outside of the truck or be selectively removable and still fall within a scope of the invention.

The system could be powered by air pistons (not illustrated) which deploy the device against springs (also not illustrated), such that any loss of air pressure makes the device retract or "fail safe". These pistons and springs (not illustrated) may be attached to a lower portion of the fins 60 such that they operate to both rotate the fins 60 about pivot point 70 and to maintain a position of fins 60. The device may be equipped with sensors and an anemometer, all hooked up to a processor 80. The processor 80 controls the system, so when a driver attempts to deploy the rig it checks if all systems are ready and within safety limits. If there is too much crosswind the anemometer will not allow deployment. If a sudden wind picks up, the anemometer will trip a retraction, much the same way as a low bridge clearance will be picked up by a sensor and trip a retraction. The brakes may also trigger a retraction. Further, if there is not enough weight in the trailer, the processor could prevent deployment.

Having thus described preferred embodiments of the invention, advantages can be appreciated. Variations from the described embodiments exist without departing from the scope of the invention. Thus it is seen that sail systems and methods for controlling various aspects of the systems are provided. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. By way of non-exclusive example, the sails may be made from various different flexible materials, the sails may be framed or loose, and they may be automated or manually deployed/adjusted. The controls for the sail system may be wired to the processor or they may communicate wirelessly. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A sail system for a land vehicle comprising:
   a sail made from a flexible material, wherein
   said sail is configured for movable attachment to said vehicle,
   said sail being substantially aligned with an upper surface of the vehicle and with a space provided below a lower surface of the sail, such that while the vehicle is moving the sail creates lift; and,
   a fin coupled to said sail and movably coupled to said vehicle, wherein said fin is configured to move the sail and to provide a lateral stabilizing force.

2. The sail system according to claim 1 wherein said sail comprises a plurality of sails and each of the plurality of sails is configured to operate in concert to provide lift to the vehicle.

3. The sail system according to claim 1 wherein the vehicle is a truck having a cab portion and a bluff portion, said sail being attached to said bluff portion.

4. The sail system according to claim 1 further comprising a control system coupled to said sail, wherein said control system is configured to deploy said sail.

5. The sail system according to claim 4 wherein said control system is further configured to adjust said sail to provide optimal lift.

6. The sail system according to claim 4 wherein said control system is configured to retract said sail.

7. The sail system according to claim 1 further comprising a plurality of fins coupled to said sail and movably coupled to said vehicle.

8. The sail system according to claim 1 further comprising a framing structure attached to said sail.

9. A method for improving fuel efficiency of a land vehicle, the method comprising:
   attaching a sail to a top portion of said vehicle, wherein at least a majority of said sail is substantially aligned with an upper surface of the vehicle thus enabling said sail to create lift while said vehicle is in motion;
   attaching a fin to said sail and movably attaching said fin to said vehicle, wherein said fin is configured to move the sail and to provide a lateral stabilizing force and,
   providing a control for configuring said sail relative to said vehicle such that said control is capable of adjusting an amount of lift created by said sail while said vehicle is in motion.

10. The method according to claim 9 further comprising attaching a plurality of sails to the top portion of the vehicle.

11. The method according to claim 10 further comprising providing a plurality of controls for separately configuring each of said plurality of sails.

12. The method according to claim 10 wherein said control is capable of configuring each of said plurality of sails.

13. The method according to claim 10 wherein said control is capable of independently adjusting each of said plurality of sails.

14. The method according to claim 9 further including attaching a plurality of fins to said sail and movably attaching said plurality of fins to said vehicle.

15. The method according to claim 1 wherein said sail comprises a plurality of sails and at least two of the plurality of sails are configured to be independently movable.

\* \* \* \* \*